US012620792B2

(12) United States Patent
Kawasaki

(10) Patent No.: US 12,620,792 B2
(45) Date of Patent: May 5, 2026

(54) ELECTRICAL CONNECTION BOX

(71) Applicant: Aisan Kogyo Kabushiki Kaisha, Obu (JP)

(72) Inventor: Yoshihiko Kawasaki, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 18/673,734

(22) Filed: May 24, 2024

(65) Prior Publication Data

US 2024/0396318 A1     Nov. 28, 2024

(30) Foreign Application Priority Data

May 26, 2023     (JP) .................................. 2023-086913

(51) Int. Cl.
*H02G 3/16*          (2006.01)
(52) U.S. Cl.
CPC ..................................... *H02G 3/16* (2013.01)
(58) Field of Classification Search
CPC ....................................................... H02G 3/16
See application file for complete search history.

(56) References Cited

U.S. PATENT DOCUMENTS

| | | | | |
|---|---|---|---|---|
| 2012/0202367 A1* | 8/2012 | Uchida | .................. | H01R 9/226 |
| | | | | 439/212 |
| 2023/0275415 A1* | 8/2023 | Komaki | .............. | B60R 16/0239 |
| | | | | 174/535 |

FOREIGN PATENT DOCUMENTS

| | | |
|---|---|---|
| JP | 2000-286565 A | 10/2000 |
| JP | 2003-259533 A | 9/2003 |
| JP | 2006-311754 A | 11/2006 |
| JP | 2021-197289 A | 12/2021 |
| JP | 2022-101130 A | 7/2022 |

* cited by examiner

*Primary Examiner* — Hung V Ngo
(74) *Attorney, Agent, or Firm* — Banner & Witcoff, Ltd.

(57) ABSTRACT

An electrical connection box may include: a bus bar constituted of metal; and a case accommodating at least a part of the bus bar. The bus bar may include a first protrusion that protrudes toward the case at a position where the bus bar is accommodated in the case. The case may include a first member constituted of resin facing the bus bar and a first hole or a first recess defined in the first member and into which the first protrusion is inserted. The bus bar may be positioned relative to the case by the first protrusion being inserted into the first hole or the first recess.

4 Claims, 7 Drawing Sheets

ELECTRICAL CONNECTION BOX

REFERENCE TO RELATED APPLICATION

This application claims priority to Japanese Patent Application No. 2023-86913 filed on May 26, 2023. The entire content of the priority application is incorporated herein by reference.

BACKGROUND ART

An electrical connection box is described in Japanese Patent Application Publication No. 2022-101130. The electrical connection box in Japanese Patent Application Publication No. 2022-101130 includes a bus bar-embedded substrate having a bus bar embedded therein, a case accommodating the bus bar-embedded substrate, and a heat sink member covering an opening of the case. The bus bar-embedded substrate is fixed to the heat sink member with screws.

SUMMARY

In the configuration of Japanese Patent Application Publication No. 2022-101130, the number of components increases because screws are required for fixing the bus bar-embedded substrate to the heat sink member. Processing for screw holes is also required. The present disclosure provides art that allows for positioning a bus bar without using screws.

In a first aspect of the art disclosed herein, an electrical connection box may comprise: a bus bar constituted of metal; and a case accommodating at least a part of the bus bar. The bus bar may comprise a first protrusion that protrudes toward the case at a position where the bus bar is accommodated in the case. The case may comprise a first member constituted of resin facing the bus bar and a first hole or a first recess defined in the first member and into which the first protrusion is inserted. The bus bar may be positioned relative to the case by the first protrusion being inserted into the first hole or the first recess.

According to this configuration, the bus bar can be positioned relative to the case by the first protrusion of the bus bar being inserted into the first hole or first recess, and as such the bus bar can be positioned without using screws.

In a second aspect of the art disclosed herein, in addition to the first aspect, the case may comprise a second member constituted of metal located on an opposite side from the bus bar via the first member. The first protrusion may be inserted into the first hole defined in the first member, and a distal end of the first protrusion may come into contact with the second member. According to this configuration, heat of the bus bar can be transferred to the second member constituted of metal. Due to this, the heat of the bus bar can be dissipated via the second member.

In a third aspect of the art disclosed herein, in addition to the second aspect, the second member may be electrically connected to a ground potential. According to this configuration, the potential at the bus bar can be stabilized.

In a fourth aspect of the art disclosed herein, in addition to the first aspect, the first protrusion may be inserted into the first hole defined in the first member, and a distal end of the first protrusion may be exposed outside the case. According to this configuration, the heat of the bus bar can be dissipated outside the case via the first protrusion.

In a fifth aspect of the art disclosed herein, in addition to any of the first to fourth aspects, the case may comprise a second protrusion disposed on the first member and that protrudes toward the bus bar at the position where the bus bar is accommodated in the case. The bus bar may comprise a second hole or a second recess into which the second protrusion is inserted. The first protrusion of the bus bar may be located closer to a distal end in a longitudinal direction of the bus bar than the second protrusion of the case is.

According to this configuration, since the bus bar can be positioned by the first protrusion of the bus bar and the second protrusion of the case, the bus bar can be stabilized. Also, the distal end of the bus bar in the longitudinal direction is a part which tends to generate heat for example by being coupled to an electrical apparatus or electrical component. However, according to the above configuration, the first protrusion of the bus bar is located closer to the distal end in the longitudinal direction of the bus bar than the second protrusion of the case is, and thus the heat of the bus bar can be dissipated via the first protrusion of the bus bar, as a result of which the distal end in the longitudinal direction of the bus bar can be suppressed from being excessively heated.

In a sixth aspect of the art disclosed herein, in addition to any of the first to fifth aspects, the bus bar may comprise a bent portion in a plan view. The first protrusion of the bus bar may be disposed on the bent portion. According to this configuration, the bus bar can be positioned by using the bent portion as a positioning reference, thus positioning work can be easily performed.

In a seventh aspect of the art disclosed herein, an electrical connection box may comprise: a bus bar constituted of metal; and a case accommodating at least a part of the bus bar. The case may comprise a protrusion that protrudes toward the bus bar at a position where the bus bar is accommodated in the case. The bus bar may comprise a hole or a recess into which the protrusion is inserted. The bus bar may be positioned relative to the case by the protrusion being inserted into the hole or the recess.

According to this configuration, since the bus bar is positioned by the protrusion of the case being inserted into the hole or the recess of the bus bar, the bus bar can be positioned without using screws.

In an eighth aspect of the art disclosed herein, in addition to the seventh aspect, the case may comprise a first member constituted of resin facing the bus bar, and a second member constituted of metal located on an opposite side from the bus bar via the first member. The protrusion may be disposed on the second member, may pierce through the first member, and may be inserted into the hole or the recess of the bus bar. According to this configuration, the heat of the bus bar can be transferred to the second member constituted of metal. Due to this, the heat of the bus bar can be dissipated.

DETAILED DESCRIPTION

First Embodiment

Figure 1:
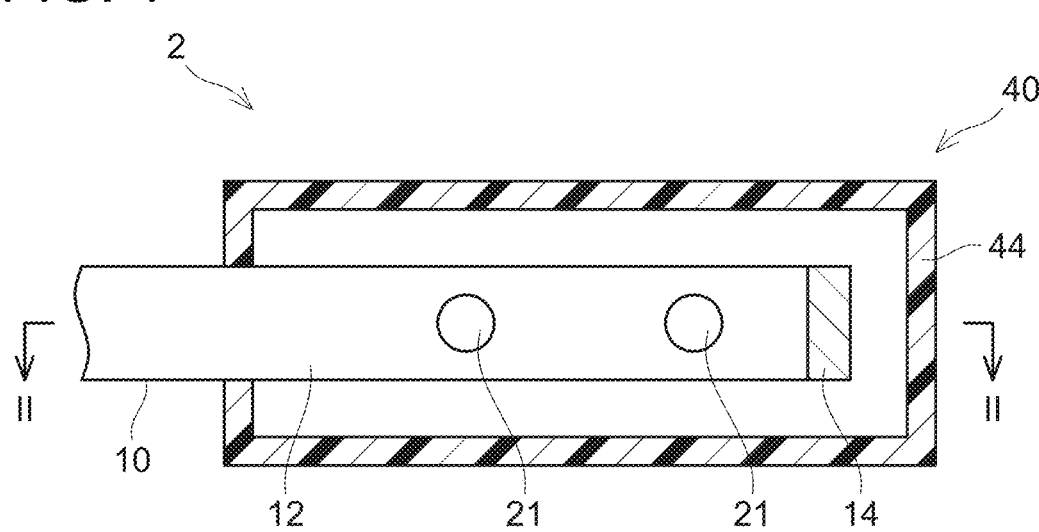
FIG. 1 illustrates a cross-sectional view of an electrical connection box according to a first embodiment.
Figure 2:
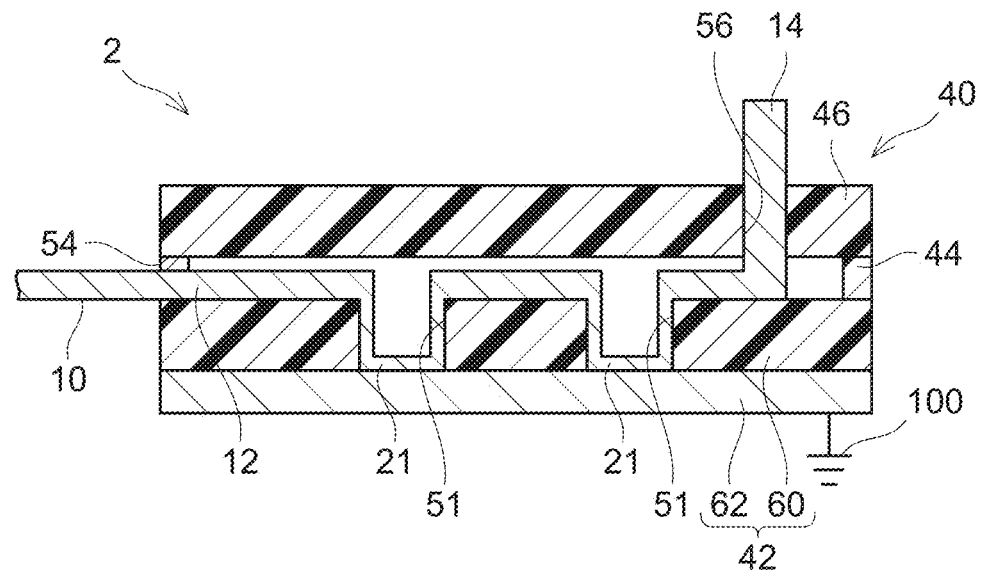
FIG. 2 illustrates a cross-sectional view taken along II-II in FIG. 1.

An electrical connection box 2 of a first embodiment will be described with reference to drawings. As shown in FIGS. 1 and 2, the electrical connection box 2 of the first embodiment comprises a bus bar 10 and a case 40 accommodating the bus bar 10.

The bus bar 10 is constituted of metal and is electrically conductive. The bus bar 10 is fabricated by processing a metal plate member, for example. The bus bar 10 is electrically connected to an electrical apparatus or electrical component, for example. The bus bar 10 may generate heat by electrical conduction. The bus bar 10 comprises a part accommodated inside the case 40 and a part not accommodated inside the case 40 but exposed outside the case 40. A part excluding both opposing ends in a longitudinal direction of the bus bar 10 is accommodated inside the case 40.

The bus bar 10 comprises a first part 12 extending in a horizontal direction and a second part 14 bending from the first part 12 and extending in a vertical direction. The first part 12 extends from outside the case 40 to inside the case 40. A base end of the first part 12 is exposed outside the case 40. A distal end of the first part 12 is accommodated inside the case 40. The base end of the first part 12 is electrically connected to a power supply (not shown), for example.

The first part 12 comprises a plurality of (two in the present embodiment) protrusions 21 at a position where the first part 12 is accommodated inside the case 40. The plurality of protrusions 21 is aligned at intervals along the longitudinal direction of the bus bar 10. Here, the number of the protrusions 21 is not specifically limited. The bus bar 10 simply needs to comprise at least one protrusion 21. The protrusions 21 are fabricated by stamping the bus bar 10, for example. The protrusions 21 are disposed such that the protrusions 21 protrude downward (i.e., toward a bottom part 42 of the case 40).

The second part 14 of the bus bar 10 extends upward (i.e., toward a lid part 46 of the case 40) from the distal end of the first part 12. The second part 14 is configured as standing upright at a distal end of the bus bar 10. The second part 14 extends from inside the case 40 to outside the case 40. A base end of the second part 14 is accommodated inside the case 40 and is connected to the first part 12. A distal end of the second part 14 is exposed outside the case 40. The distal end of the second part 14 is electrically connected to an electrical apparatus or electrical component, for example.

Next, the case 40 in which the bus bar 10 is accommodated will be described. The case 40 is shaped in a substantially box, and comprises the bottom part 42, a wall part 44, and the lid part 46. The bottom part 42 of the case 40 supports the first part 12 of the bus bar 10. The first part 12 of the bus bar 10 is arranged above the bottom part 42.

The bottom part 42 comprises a first member 60 located on an inner side in the case 40 (i.e., bus bar 10 side) and a second member 62 located on an outer side in the case 40 (i.e., on an opposite side from the bus bar 10 via the first member 60). The first member 60 is constituted of resin and has insulation properties. The second member 62 is constituted of metal and electrically conductive.

The first member 60 faces the first part 12 of the bus bar 10 which is located inside the case 40. The first member 60 is arranged between the second member 62 and the bus bar 10. The first member 60 comprises a plurality of holes 51 (two in the present embodiment). The plurality of holes 51 pierces through the first member 60. The plurality of holes 51 is aligned at intervals along the longitudinal direction of the bus bar 10. Here, the number of the holes 51 is not specifically limited. The first member 60 simply needs to comprise at least one hole 51. The first member 60 comprises a corresponding number of the holes 51 to the number of the protrusions 21 of the bus bar 10. The holes 51 of the first member 60 engage with the protrusions 21 of the bus bar 10. The protrusions 21 of the bus bar 10 are inserted into the holes 51 of the first member 60. The bus bar 10 is positioned relative to the case 40 by the protrusions 21 of the bus bar 10 being inserted into the holes 51 of the first member 60.

The second member 62 of the bottom part 42 is fixed to an outer surface (i.e., surface opposite from the bus bar 10) of the first member 60. The second member 62 caps the plurality of holes 51 defined in the first member 60. The second member 62 faces the plurality of protrusions 21 of the bus bar 10 via the plurality of holes 51. The protrusions 21 of the bus bar 10 pierces through the holes 51 of the first member 60 and comes into contact with the second member 62. Distal ends of the protrusions 21 are in contact with the second member 62. The bus bar 10 is electrically connected to the second member 62 via the protrusions 21. The second member 62 is electrically connected to a ground potential 100. The bus bar 10 is electrically connected to the ground potential 100 via the second member 62.

The wall part 44 of the case 40 is integrally configured with the bottom part 42. The wall part 44 surrounds the first part 12 of the bus bar 10. The wall part 44 has a hole 54 into which the first part 12 of the bus bar 10 is inserted defined therethrough. The first part 12 of the bus bar 10 passes through the hole 54 and extends inside and outside the case 40.

The lid part 46 of the case 40 is disposed in a manner of covering the first part 12 of the bus bar 10. The lid part 46 is fixed to the wall part 44. The lid part 46 has a hole 56 into which the second part 14 of the bus bar 10 is inserted defined therethrough. The second part 14 of the bus bar 10 passes through the hole 56 and extends inside and outside the case 40.

Effects

Given the above, the electrical connection box 2 according to the first embodiment was described. As is apparent from the above description, the bus bar 10 comprises the protrusions 21 (example of a first protrusion) that protrudes toward the case 40 at the position where the bus bar 10 is accommodated in the case 40. The case 40 comprises the first member 60 constituted of resin facing the bus bar 10 and the holes 51 (example of a first hole) defined in the first member 60 and into which the protrusions 21 are inserted. The bus bar 10 is positioned relative to the case 40 by the protrusions 21 being inserted into the holes 51. According to this configuration, the bus bar 10 can be positioned without using screws.

The case 40 comprises the second member 62 constituted of metal located on the opposite side from the bus bar 10 via the first member 60. The protrusions 21 of the bus bar 10 are inserted into the holes 51 defined in the first member 60 and the distal ends of the protrusions 21 come into contact with the second member 62. According to this configuration, the heat of the bus bar 10 can be transferred to the second member 62 constituted of metal. Due to this, the heat of the bus bar 10 can be dissipated via the second member 62.

The second member 62 is electrically connected to the ground potential 100. According to this configuration, the potential at the bus bar 10 can be stabilized.

The first embodiment was described so far, but the configuration of the electrical connection box 2 is not limited to features of the first embodiment. Other embodiments will be described below. Configurations similar to those of the first embodiment may be omitted hereafter.

Second Embodiment

Figures 3, 4:
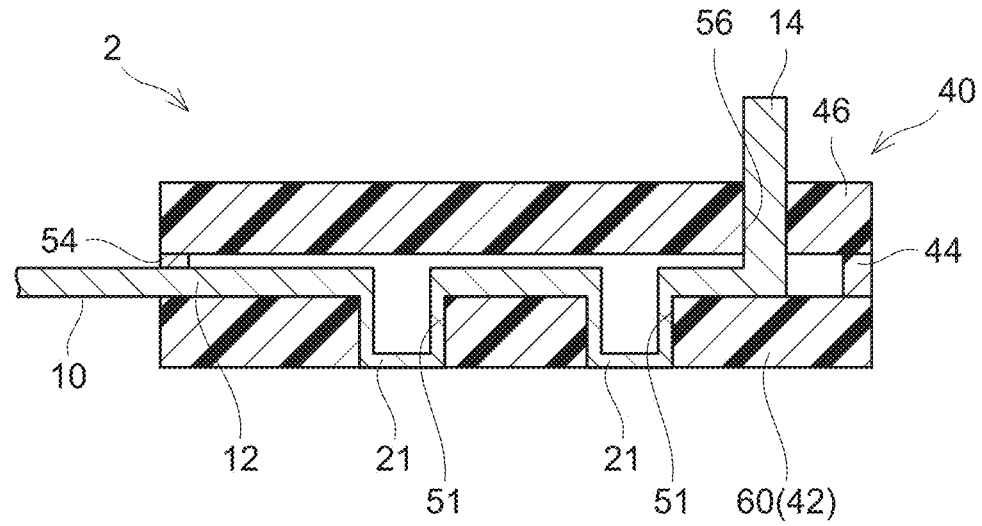
FIG. 3 illustrates a cross-sectional view of an electrical connection box according to a second embodiment (corresponding to FIG. 2).
FIG. 4 illustrates a cross-sectional view of an electrical connection box according to a third embodiment (corresponding to FIG. 2).

As shown in FIG. 3, in an electrical connection box 2 according to a second embodiment, a second member 62 of a bottom part 42 in a case 40 comprises a plurality of (two in the present embodiment) holes 71. The plurality of holes 71 pierces through the second member 62. The plurality of holes 71 is aligned at intervals along the longitudinal direction of a bus bar 10. The holes 71 defined in the second member 62 of the bottom part 42 are connected with holes 51 defined in the first member 60 of the bottom part 42. Here, the number of the holes 71 is not specifically limited. The second member 62 simply needs to comprise at least one hole 71. The second member 62 comprises a corresponding number of the holes 71 to the number of the holes 51 in the first member 60.

In the electrical connection box 2 according to the second embodiment, the protrusions 21 of the bus bar 10 are inserted into the holes 51 defined in the first member 60 of the bottom part 42. A protruding length of the protrusions 21 may be appropriately modified. For example, distal ends of the protrusions 21 may be located on an outer side relative to an outer surface (i.e., surface opposite from the bus bar 10) of the first member 60 of the bottom part 42 and also on an inner side relative to an outer surface of the second member 62 of the bottom part 42. The distal ends of the protrusions 21 may be located inside the holes 71 of the second member 62. The distal ends of the protrusions 21 are exposed outside the case 40 through the holes 71 of the second member 62. In a modification, the distal ends of the protrusions 21 may be located on the outer side relative to the outer surface of the second member 62 of the bottom part 42. The distal ends of the protrusions 21 may be located outside the holes 71 of the second member 62. The distal ends of the protrusions 21 are exposed directly outside the case 40. According to the above configuration, the heat of the bus bar 10 can be dissipated outside the case 40 via the protrusions 21.

Third Embodiment

As shown in FIG. 4, in an electrical connection box 2 according to a third embodiment, a bottom part 42 of a case 40 may not comprise a second member 62. The second member 62 of the bottom part 42 may be omitted. According to this configuration also, the heat of a bus bar 10 can be transferred outside a case 40 via protrusions 21 of the bus bar 10. Here, a protruding length of the protrusions 21 may be appropriately modified. For example, distal ends of the protrusions 21 may be located on the inner side relative to an outer surface (i.e., surface opposite from the bus bar 10) of a first member 60 of the bottom part 42. The distal ends of the protrusions 21 may be located inside holes 51 of the first member 60. The distal ends of the protrusions 21 are exposed outside the case 40 through the holes 51 of the first member 60. In a modification, the distal ends of the protrusions 21 may be located on the outer side relative to the outer surface of the first member 60 of the bottom part 42. The distal ends of the protrusions 21 may be located outside the holes 51 of the first member 60. The distal ends of the protrusions 21 are exposed directly outside the case 40.

Fourth Embodiment

Figures 5, 6:
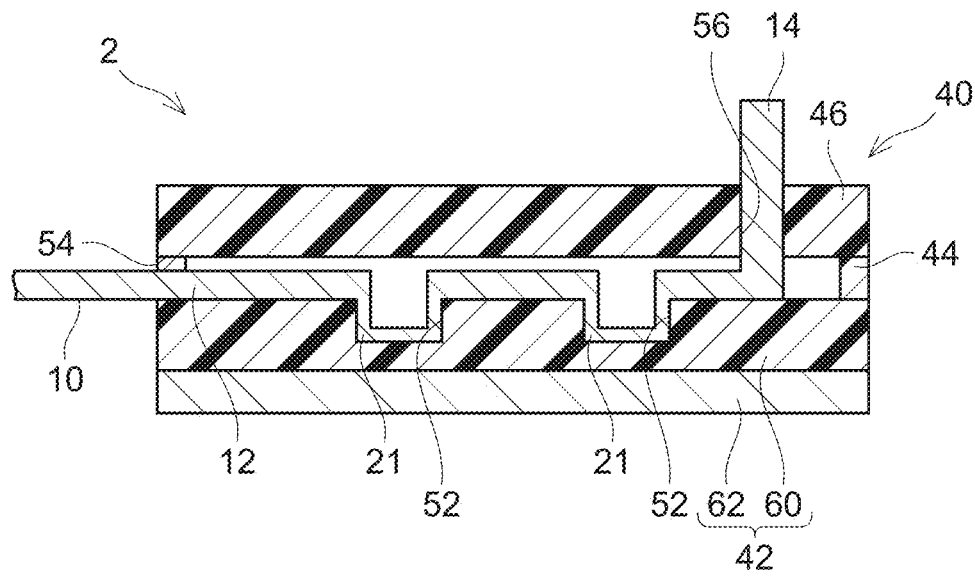
FIG. 5 illustrates a cross-sectional view of an electrical connection box according to a fourth embodiment (corresponding to FIG. 2).
FIG. 6 illustrates a cross-sectional view of an electrical connection box according to a fifth embodiment (corresponding to FIG. 2).

As shown in FIG. 5, in an electrical connection box 2 according to a fourth embodiment, a first member 60 of a bottom part 42 in a case 40 comprises a plurality of (two in the present embodiment) protrusions 81 (example of second protrusion) that protrudes upward (i.e., toward a first part 12 of a bus bar 10). The first member 60 comprises the plurality of protrusions 81 at a position where the bus bar 10 is accommodated in the case 40. The plurality of protrusions 81 is aligned at intervals along the longitudinal direction of the bus bar 10. Here, the number of the protrusions 81 is not specifically limited. The first member 60 simply needs to comprise at least one protrusion 81.

The first part 12 of the bus bar 10 comprises the plurality of (two in the present embodiment) holes 31 (example of second hole). The plurality of holes 31 pierces through the first part 12 of the bus bar 10. The plurality of holes 31 is aligned at intervals along the longitudinal direction of the bus bar 10. Here, the number of the holes 31 is not specifically limited. The first part 12 of the bus bar 10 simply needs to comprise at least one hole 31. The first part 12 of the bus bar 10 comprises a corresponding number of the holes 31 to the number of the protrusions 81 disposed on the first member 60 of the bottom part 42 in the case 40. The holes 31 of the bus bar 10 engage with the protrusions 81 of the first member 60 of the bottom part 42. The protrusions 81 of the first member 60 are inserted into the holes 31 of the bus bar 10. The bus bar 10 is positioned relative to the case 40 by the protrusions 81 of the first member 60 being inserted into the holes 31 of the bus bar 10.

In the electrical connection box 2 according to the fourth embodiment, a protrusion 21 of the first part 12 of the bus bar 10 is located closer to a distal end in the longitudinal direction of the bus bar 10 (i.e., closer to second part 14) than the protrusions 81 of the first member 60 of the case 40 are. When there is a plurality of the protrusions 21, no protrusion 81 is located closer to the distal end in the longitudinal direction of the bus bar 10 than one of the protrusions 21 of the first part 12 of the bus bar 10 that is the closest to the distal end. In the longitudinal direction of the bus bar 10, the one of the protrusions 21 that is the closest to the distal end is located even closer to the distal end than one of the protrusions 81 that is the closest to the distal end.

According to this configuration, the protrusion 21 disposed on the bus bar 10 and the protrusions 81 disposed on the bottom part 42 of the case 40 can allow the bus bar 10 to be stabilized. Also, the distal end in the longitudinal direction of the bus bar 10 (in the present embodiment, the second part 14 of the bus bar 10) is a part which tends to generate heat by being coupled to an electrical apparatus or electrical component, for example. However, according to the above configuration, the protrusion 21 of the bus bar 10 is located closer to the distal end in the longitudinal direction of the bus bar 10 than the protrusions 81 of the bottom part 42 of the case 40 are, and thus the heat of the bus bar 10 can be dissipated via the protrusion 21 of the bus bar 10, as a result of which the distal end in the longitudinal direction of the bus bar 10 can be suppressed from being excessively heated.

Fifth Embodiment

In the above embodiment, although the holes 51 are defined in the first member 60 of the bottom part 42 in the case 40, this configuration is not limiting. As shown in FIG. 6, in an electrical connection box 2 according to a fifth embodiment, a plurality of (two in the present embodiment) of recesses 52 (example of first recess) is defined in a first member 60 of a bottom part 42 of a case 40. The plurality of recesses 52 is aligned at intervals along the longitudinal direction of the bus bar 10. Here, the number of recesses 52 is not specifically limited. The first member 60 simply needs to comprise at least one recess 52. The first member 60 comprises a corresponding number of the recesses 52 to the number of protrusions 21 of the bus bar 10. The recesses 52 of the first member 60 engage with the protrusions 21 of the bus bar 10. The protrusions 21 of the bus bar 10 are inserted into the recesses 52 of the first member 60. The bus bar 10 is positioned relative to the case 40 by the protrusions 21 being inserted into the recesses 52. According to this configuration also, the bus bar 10 can be positioned without using screws.

Sixth Embodiment

Figures 7, 8:
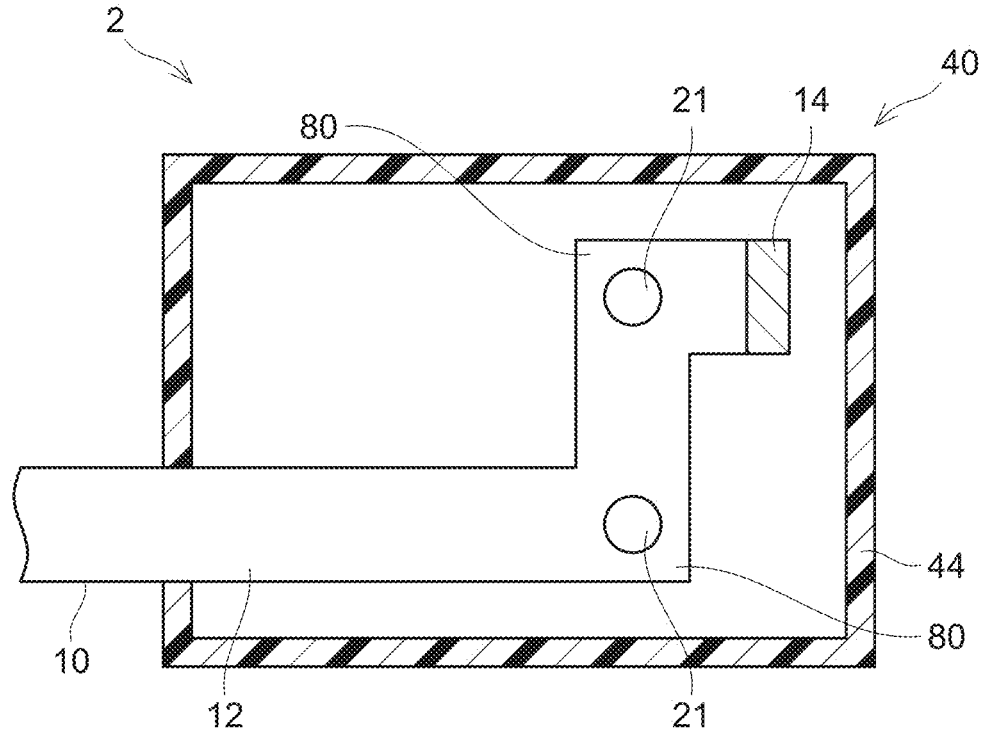
FIG. 7 illustrates a cross-sectional view of an electrical connection box according to a sixth embodiment (corresponding to FIG. 2).
FIG. 8 illustrates a cross-sectional view of an electrical connection box according to a seventh embodiment (plan view of a first part of a bus bar).

Although the holes 31 are defined in the first part 12 of the bus bar 10 in the above fourth embodiment (see FIG. 5), this is not limiting. As shown in FIG. 7, in an electrical connection box 2 according to a sixth embodiment, a plurality of (two in the present embodiment) recesses 32 (example of second recesses) is defined in a first part 12 of a bus bar 10. The plurality of recesses 32 is aligned at intervals along the longitudinal direction of the bus bar 10. Here, the number of the recesses 32 is not specifically limited. The first part 12 of the bus bar 10 simply needs to comprise at least one recess 32. The first part 12 of the bus bar 10 comprises a corresponding number of the recesses 32 to the number of protrusions 81 disposed on a first member 60 of a bottom part 42 in a case 40. The recesses 32 of the bus bar 10 engage with the protrusions 81 of the first member 60 of the bottom part 42. The protrusions 81 of the first member 60 are inserted into the recesses 32 of the bus bar 10. The bus bar 10 is positioned relative to the case 40 by the protrusions 81 of the first member 60 being inserted into the recesses 32 of the bus bar 10.

Seventh Embodiment

As shown in FIG. 8, in an electrical connection box 2 according to a seventh embodiment, a first part 12 of a bus bar 10 comprises a plurality of bent portions 80 in a plan view. The first part 12 of the bus bar 10 bends, for example, leftward and then bends rightward. The bus bar 10 bends 90 degrees, for example, at each bent portion 80. Here, the number of the bent portions 80 is not specifically limited. The bus bar 10 simply needs to comprise at least one bent portion 80.

The bent portions 80 of the bus bar 10 have protrusions 21 disposed thereon. One protrusion 21 is disposed on each bent portion 80. In a modification, a plurality of the protrusions 21 may be disposed on each bent portion 80. According to the seventh embodiment configuration, the bus bar 10 can be positioned by using the bent portions 80 as a positioning reference, and positioning work can be easily performed accordingly.

Eighth Embodiment

Figure 9:
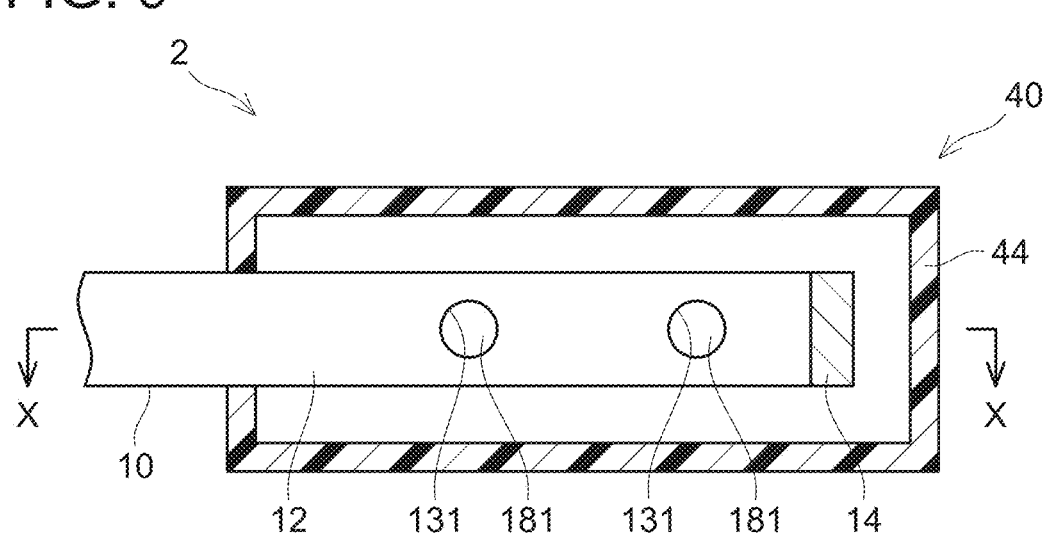
FIG. 9 illustrates a cross-sectional view of an electrical connection box according to an eighth embodiment.
Figure 10:
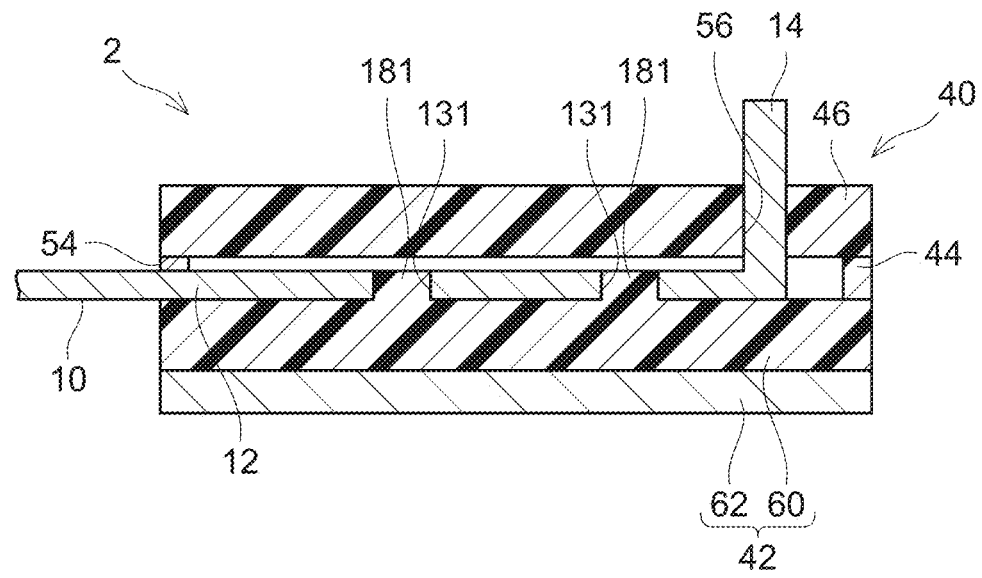
FIG. 10 illustrates a cross-sectional view taken along X-X in FIG. 9.

As shown in FIGS. 9 and 10, in an electrical connection box 2 according to an eighth embodiment, a first member 60 of a bottom part 42 in a case 40 comprises a plurality of (two in the present embodiment) protrusions 181 that protrudes upward (i.e., toward a first part 12 of the bus bar 10). The first member 60 comprises the plurality of protrusions 181 at a position where the bus bar 10 is accommodated in the case 40. The plurality of protrusions 181 is aligned at intervals along the longitudinal direction of the bus bar 10. Here, the number of the protrusions 181 is not specifically limited. The first member 60 of the bottom part 42 simply needs to comprise at least one protrusion 181.

The first part 12 of the bus bar 10 comprises a plurality of (two in the present embodiment) holes 131. The plurality of holes 131 pierces through the first part 12 of the bus bar 10. The plurality of holes 131 is aligned at intervals along the longitudinal direction of the bus bar 10. Here, the number of the holes 131 is not specifically limited. The first part 12 of the bus bar 10 simply needs to comprise at least one hole 131. The first part 12 of the bus bar 10 comprises a corresponding number of the holes 131 to the number of the protrusions 181 disposed on the first member 60 of the bottom part 42 in the case 40.

The holes 131 of the bus bar 10 engage with the protrusions 181 of the first member 60 of the bottom part 42. The protrusions 181 of the first member 60 are inserted into the holes 131 of the bus bar 10. A protruding length of the protrusions 181 may be appropriately modified. For example, distal ends of the protrusions 181 may be located below an upper surface (i.e., surface opposite from the bottom part 42) of the first part 12 of the bus bar 10. The distal ends of the protrusions 181 may be located inside the holes 131 of the bus bar 10. In a modification, the distal ends of the protrusions 181 may be located above the upper surface of the first part 12 of the bus bar 10. The distal ends of the protrusions 181 may be located outside the holes 131 of the bus bar 10. In the eighth embodiment, the bus bar 10 is positioned relative to the case 40 by the protrusions 181 of the first member 60 being inserted into the holes 131 of the bus bar 10. According to this configuration, the bus bar 10 can be positioned without using screws.

Ninth Embodiment

Figures 11, 12:
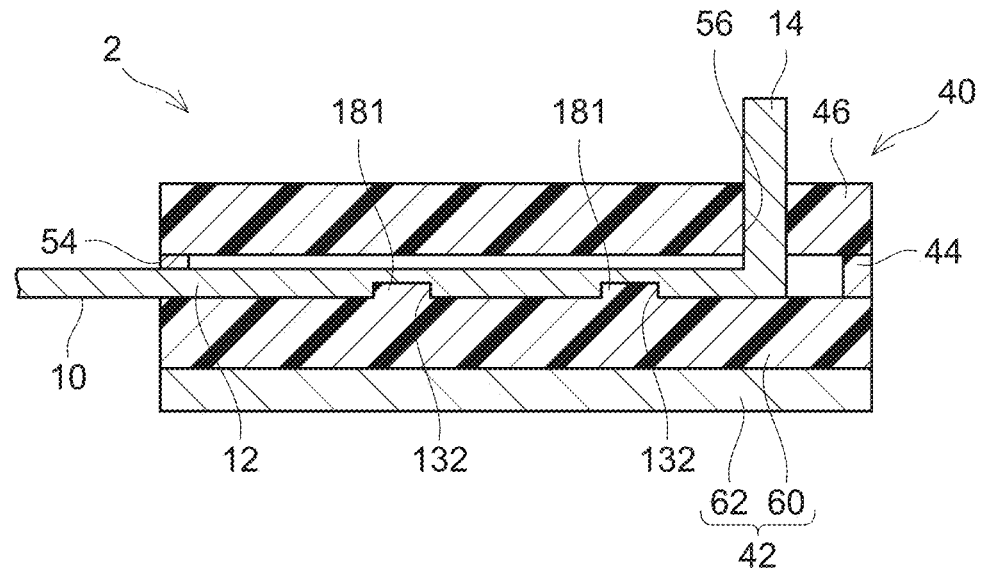
FIG. 11 illustrates a cross-sectional view of an electrical connection box according to a ninth embodiment (corresponding to FIG. 10).
FIG. 12 illustrates a cross-sectional view of an electrical connection box according to a tenth embodiment (corresponding to FIG. 10).

As shown in FIG. 11, in an electrical connection box 2 according to a ninth embodiment, a second member 62 of a bottom part 42 in a case 40 comprises a plurality of (two in the present embodiment) protrusions 191 that protrudes upward (i.e., toward a first part 12 of the bus bar 10). The protrusions 191 are fabricated by stamping the second member 62 of the bottom part 42, for example. The second member 62 comprises the plurality of protrusions 191 at a position where the bus bar 10 is accommodated in the case 40. The plurality of protrusions 191 is aligned at intervals along the longitudinal direction of the bus bar 10. Here, the number of the protrusions 191 is not specifically limited. The second member 62 simply needs to comprise at least one protrusion 191. The second member 62 comprises a corresponding number of the protrusions 191 to the number of the holes 131 defined in the first part 12 of the bus bar 10.

In the electrical connection box 2 according to the ninth embodiment, the first member 60 of the bottom part 42 comprises a plurality of (two in the present embodiment) holes 161. The plurality of holes 161 pierces through the first member 60 of the bottom part 42. The plurality of holes 161 is aligned at intervals along the longitudinal direction of the bus bar 10. Here, the number of the holes 161 is not specifically limited. The first member 60 simply needs to comprise at least one hole 161. The first member 60 comprises a corresponding number of the holes 161 to the number of the protrusions 191 disposed on the second member 62.

The protrusions 191 of the second member 62 engage with the holes 161 of the first member 60. The protrusions 191 of the second member 62 are inserted into the holes 161 of the first member 60. The protrusions 191 of the second member 62 pierce through the holes 161 of the first member 60 and engage with the holes 131 of the bus bar 10. The protrusions 191 of the second member 62 are inserted into the holes 131 of the bus bar 10. A protruding length of the protrusions 191 may be appropriately modified. For example, distal ends of the protrusions 191 may be located above an upper surface (i.e., surface opposite from the bottom part 42) of the first part 12 of the bus bar 10. The distal ends of the protrusions 191 may be located outside the holes 131 of the bus bar 10. In a modification, the distal ends of the protrusions 191 may be located below the upper surface of the first part 12 of the bus bar 10. The distal ends of the protrusions 191 may be located inside the holes 131 of the bus bar 10. Also, the distal ends of the protrusions 191 may be in contact with the first part 12 of the bus bar 10. The bus bar 10 may be electrically connected to the second member 62 of the bottom part 42 via the protrusions 191. The second member 62 is electrically connected to a ground potential 100. The bus bar 10 is electrically connected to the ground potential 100 via the second member 62.

According to the above configuration, the bus bar 10 is positioned relative to the case 40 by the protrusions 191 of the second member 62 of the bottom part 42 being inserted into the holes 131 of the bus bar 10. Due to this, the bus bar 10 can be positioned without using screws.

Tenth Embodiment

Although the holes 131 are defined in the first part 12 of the bus bar 10 in the above embodiment, this configuration is not limiting. As shown in FIG. 12, in an electrical connection box 2 according to a tenth embodiment, a plurality of (two in the present embodiment) recesses 132 is defined in a first part 12 of a bus bar 10. The plurality of recesses 132 is aligned at intervals along a longitudinal direction of the bus bar 10. Here, the number of the recesses 132 is not specifically limited. The first part 12 of the bus bar

10 simply needs to comprise at least one recess 132. The first part 12 of the bus bar 10 comprises a corresponding number of the recesses 132 to the number of protrusions 181 disposed on a first member 60 of a bottom part 42. The recesses 132 of the bus bar 10 engage with the protrusions 181 of the first member 60 of the bottom part 42. The protrusions 181 of the first member 60 of the bottom part 42 are inserted into the recesses 132 of the bus bar 10. The bus bar 10 is positioned relative to the case 40 by the protrusions 181 being inserted into the recesses 132. According to this configuration also, the bus bar 10 can be positioned without using screws.

Eleventh Embodiment

Figures 13, 14:
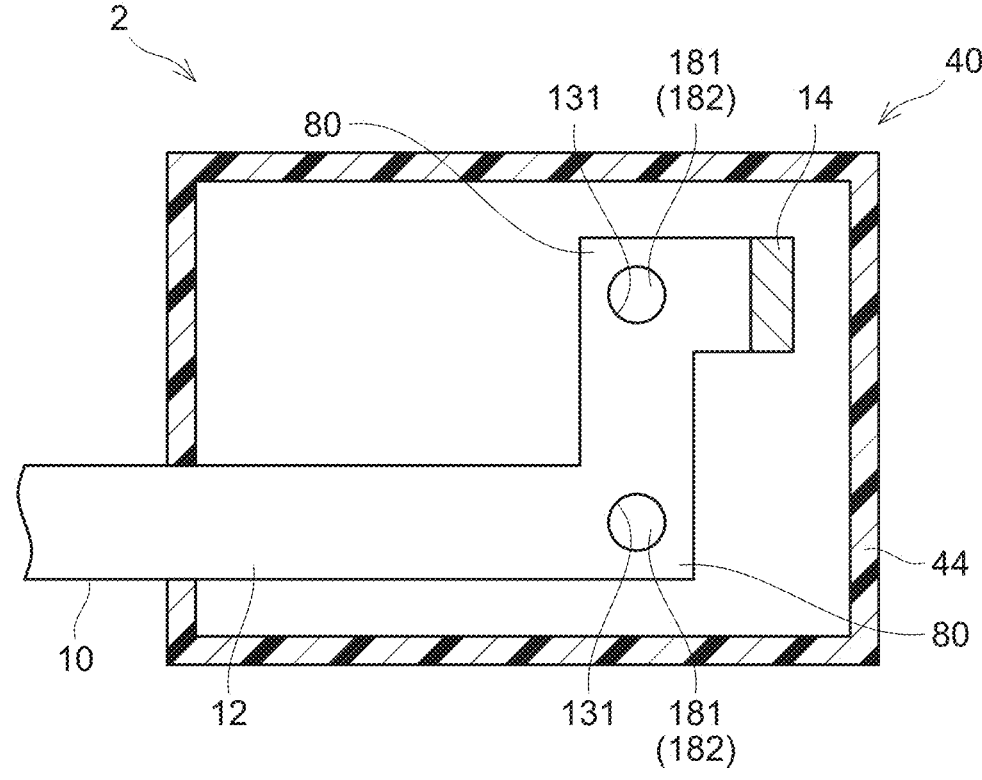
FIG. 13 illustrates a cross-sectional view of an electrical connection box according to an eleventh embodiment (corresponding to FIG. 10).
FIG. 14 illustrates a cross-sectional view of an electrical connection box according to a twelfth embodiment (plan view of a first part of a bus bar).

As shown in FIG. 13, in an electrical connection box 2 according to an eleventh embodiment, protrusions 191 disposed on a second member 62 of a bottom part 42 engage with recesses 132 of a bus bar 10. The protrusions 191 of the second member 62 are inserted into the recesses 132 of the bus bar 10. According to this configuration also, the bus bar 10 can be positioned without using screws.

Twelfth Embodiment

As shown in FIG. 14, in an electrical connection box 2 according to a twelfth embodiment, a first part 12 of a bus bar 10 comprises a plurality of bent portions 80 in a plan view. The first part 12 of the bus bar 10 bends leftward, for example, and then bends rightward. The bus bar 10 bends 90 degrees for example at each bent portion 80.

Holes 131 are defined at the bent portions 80 of the bus bar 10. One hole 131 is defined at each bent portion 80. In a modification, a plurality of the holes 131 may be defined at each bent portion 80. Protrusions 181 (or protrusions 191) of a bottom part 42 of a case 40 are inserted into the holes 131 of the bus bar 10. According to the twelfth embodiment configuration, the bus bar 10 can be positioned by using the bent portions 80 as a positioning reference, and positioning work can be easily performed accordingly. In a modification, one or more recesses 132 may be defined at the bent portions 80 of the bus bar 10. The protrusion(s) 181 (or the protrusion(s) 191) may be inserted into the recess(es) 132 defined at the bent portions 80.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An electrical connection box comprising:
   a bus bar constituted of metal; and
   a case accommodating at least a part of the bus bar,
   wherein
   the bus bar comprises a first protrusion that protrudes toward the case at a position where the bus bar is accommodated in the case, the case comprises a first member constituted of resin facing the bus bar, a first hole defined in the first member and into which the first protrusion is inserted, and a second member constituted of metal located on an opposite side from the bus bar via the first member, the bus bar is positioned relative to the case by the first protrusion being inserted into the first hole, and the first protrusion is inserted into the first hole defined in the first member, and a distal end of the first protrusion comes into contact with the second member.

2. The electrical connection box according to claim 1, wherein the second member is electrically connected to a ground potential.

3. An electrical connection box comprising:

a bus bar constituted of metal; and a case accommodating at least a part of the bus bar, wherein the bus bar comprises a first protrusion that protrudes toward the case at a position where the bus bar is accommodated in the case, the case comprises a first member constituted of resin facing the bus bar, a first hole or a first recess defined in the first member and into which the first protrusion is inserted, and a second protrusion disposed on the first member and that protrudes toward the bus bar at the position where the bus bar is accommodated in the case, the bus bar is positioned relative to the case by the first protrusion being inserted into the first hole or the first recess, the bus bar comprises a second hole or a second recess into which the second protrusion is inserted, and the first protrusion of the bus bar is located closer to a distal end in a longitudinal direction of the bus bar than the second protrusion of the case is.

4. An electrical connection box comprising:

a bus bar constituted of metal; and a case accommodating at least a part of the bus bar, wherein the case comprises a protrusion that protrudes toward the bus bar at a position where the bus bar is accommodated in the case, a first member constituted of resin facing the bus bar, and a second member constituted of metal located on an opposite side from the bus bar via the first member, the bus bar comprises a hole or a recess into which the protrusion is inserted, the bus bar is positioned relative to the case by the protrusion being inserted into the hole or the recess, and the protrusion is disposed on the second member, pierces through the first member, and is inserted into the hole or the recess of the bus bar.

* * * * *